United States Patent [19]

Shimura et al.

[11] Patent Number: 4,859,849

[45] Date of Patent: Aug. 22, 1989

[54] RADIATION IMAGE RECORDING AND READ-OUT APPARATUS

[75] Inventors: Kazuo Shimura; Masamitsu Ishida, both of Kanagawa, Japan

[73] Assignee: Fuji Photo Film Co., Ltd., Kanagawa, Japan

[21] Appl. No.: 787,846

[22] Filed: Oct. 16, 1985

[30] Foreign Application Priority Data

Oct. 16, 1984 [JP] Japan ................. 59-216910
Oct. 19, 1984 [JP] Japan ................. 59-220279

[51] Int. Cl.$^4$ ........................................... G01N 23/04
[52] U.S. Cl. ........................ 250/327.2; 378/95; 378/156; 378/157
[58] Field of Search ............ 378/16, 5, 95, 156, 378/157; 250/327.2, 484.1

[56] References Cited

U.S. PATENT DOCUMENTS

| | | | |
|---|---|---|---|
| 4,433,428 | 2/1984 | Haendle et al. | 378/99 |
| 4,482,918 | 11/1984 | Keyes et al. | 378/99 |
| 4,513,078 | 4/1985 | Sandrik et al. | 250/475.2 |
| 4,543,479 | 9/1985 | Kato | 250/327.2 |
| 4,564,861 | 1/1986 | Hishinuma et al. | 378/162 |
| 4,578,803 | 3/1986 | Macovski | 378/156 |
| 4,687,932 | 8/1987 | Tamura et al. | 250/484.1 B |
| 4,733,076 | 3/1988 | Tamura | 250/484.1 B |

FOREIGN PATENT DOCUMENTS

| | | | |
|---|---|---|---|
| 36242 | 2/1984 | Japan | 378/172 |
| 192240 | 10/1984 | Japan | 250/327.2 K |

Primary Examiner—Carolyn E. Fields
Attorney, Agent, or Firm—Sughrue, Mion, Zinn, Macpeak & Seas

[57] ABSTRACT

A radiation image recording and read-out apparatus comprises a circulation transfer means for transferring a stimulable phosphor sheet along a predetermined circulation path; an image recording section which is disposed in the circulation path and in which a radiation image of an object is recorded on the stimulable phosphor sheet by exposing the stimulable phosphor sheet to radiation passing through the object; an image read-out section which is disposed in the circulation path for scanning the stimulable phosphor sheet with stimulating rays and detecting light emitted from the stimulable phosphor sheet to obtain an image signal; and an erasing section which is disposed in the circulation path and releases residual radiation energy in the stimulable phosphor sheet before the stimulable phosphor sheet is returned to the image recording section. The radiation image recording and read-out apparatus further includes a radiation quality changing filter for changing the quality of the radiation. The filter is arranged to be inserted into or retracted away from the path of the radiation in synchronization with the operation of a stimulable phosphor sheet changing mechanism for discharging one stimulable phosphor sheet from the recording position in the image recording section and positioning another sheet in the recording section.

10 Claims, 7 Drawing Sheets

RADIATION IMAGE RECORDING AND READ-OUT APPARATUS

BACKGROUND OF THE INVENTION

1. Field of the Invention

This invention relates to a radiation image recording and read-out apparatus for exposing stimulable phosphor sheets to a radiation passing through an object to have a radiation image of the object stored therein, exposing the stimulable phosphor sheets to stimulating rays which cause them to emit light in proportion to the stored radiation energy, and detecting and converting the emitted light into electric signals. This invention particularly relates to a radiation image recording and read-out apparatus in which the stimulable phosphor sheets are circulated and reused for recording radiation images.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining in the stimulable phosphor sheet after it is scanned with stimulating rays to read out the radiation image stored therein should be erased by exposure to light or heat as described, for example, in Japanese Unexamined Patent Publication No. 56(1981)-12599 or U.S. Pat. No. 4,400,619. The stimulable phosphor sheet should then be used again for radiation image recording.

As is well known, an object, e.g., human organs, bones, blood vessels and the like, exhibits radiation absorption properties specific to its structure. Utilizing this fact, there has been proposed an energy-subtraction method in which an object is exposed to radiations different from each other in quality to obtain a pair of radiation images and one of them is subtracted from the other after properly weighting them, whereby these can be obtained an image of a particular part of the object.

In the energy-subtraction method, a plurality of radiation images of a given object must be obtained while the object remains stationary to prevent recording of a motion artifact due to motion of the object. That is, in the radiation image recording and read-out apparatus described above, a plurality of stimulable phosphor sheets must be exposed to radiation under different conditions in the image recording section.

SUMMARY OF THE INVENTION

In view of the foregoing observations and description, the primary object of the present invention is to provide a radiation image recording and read-out apparatus which enables stimulable phosphor sheets for recording radiation images to be repeatedly used, which enables a plurality of radiation images to be recorded at a high speed, which can be compactly fabricated for easy installation in and transport by a vehicle such as an X-ray bus, and which enables radiation image recording for energy-subtraction processing to be effected easily, and automatically.

The radiation image recording and read-out apparatus in accordance with the present invention comprises (i) a circulating and conveying means for conveying a plurality of stimulable phosphor sheets for recording radiation images thereon along a predetermined circulation path, (ii) an image recording section positioned on said circulation path for recording the radiation image of an object on each of said stimulable phosphor sheets by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, and (iv) an erasing section positioned on said circulation path for, prior to the next image recording on said stimulable phosphor sheet for which the image read-out has been conducted at said image read-out section, having said stimulable phosphor sheet release the radiation energy remaining in said stimulable phosphor sheet. In one aspect, the radiation image recording and read-out apparatus of the present invention further includes a radiation quality changing means for changing the quality of the radiation to be irradiated to the stimulable phosphor sheet to record a radiation image of the object in the image recording section, and the radiation quality changing means is arranged to synchronize with a stimulable phosphor sheet changing means for feeding the stimulable phosphor sheet to the recording position in the image recording section and discharging it therefrom. The radiation quality changing means may be means for changing the quality of radiation emitted from a radiation source such as means for changing the tube voltage of the radiation source, or may be means for changing the quality of radiation impinging upon the stimulable phosphor sheet such as those comprising a filter which is inserted into or retracted away from the path of the radiation. In the latter case, the radiation quality changing means may comprise a single filter which changes the quality of the radiation between that of the radiation impinging upon the stimulable phosphor sheet as it is emitted and the radiation source to that of the radiation impinging upon the stimulable phosphor sheet after passing through the filter, or may comprise a plurality of filters which have different radiation transmission characteristics and selectively inserted into the path of the radiation.

In another aspect of the present invention, a pair of superposed stimulable phosphor sheets are fed to the image recording section with a filter intervening therebetween and the stimulable phosphor sheets are simultaneously exposed to radiation, one being exposed to the radiation emitted from the radiation source as it is and the other being exposed to the radiation passing through the filter, thereby obtaining two radiation images for use in energy-subtraction processing.

The image signal obtained in the image read-out section may be once stored in a storage medium such as a magnetic recording tape or a magnetic recording disk, or may be reproduced as a visible image on a display device such as a CRT, or as a hard copy. The reproducing system may be directly connected to the radiation image recording and readout apparatus of the present invention or may be installed remote from the radiation image recording and read-out apparatus to receive the image signal by radio transmission. For example, a reproducing system may be installed in a hospital and the radiation image recording and read-out apparatus of the present invention may be mounted on a mobile station such as an X-raying bus. The image signal obtained by the radiation image recording and read-out apparatus can then be sent by radio to the reproducing system in the hospital, where the radiation image of the patient is reproduced on a CRT, for example. A doctor can then make a diagnosis on the basis of the reproduced radiation image and send his diagnosis to the mobile station by radio.

A plurality of stimulable phosphor sheets for use in the energy-subtraction method may all be of the same kind or may be of different kinds having different radiation absorption characteristics as disclosed in Japanese Unexamined Patent Publication No. 59(1984)-83486. Stimulable phosphor sheets can be said to be different in their radiation absorption characteristics when the stimulable phosphor layers thereof comprise different phosphors exhibiting different absorption characteristics to incident radiation, or when the stimulable phosphor layers thereof comprise the same phosphor but are different in thickness or the like so that the rate of absorption differs for a given incident radiation. It is preferred that a stimulable phosphor sheet exhibiting higher radiation absorption on the high energy side be used in the case of high-energy recording, i.e. when the stimulable phosphor sheet is exposed to "hard" radiation, and a stimulable phosphor sheet exhibiting higher radiation absorption on the lower energy side be used in the case of low-energy recording, i.e. when the stimulable phosphor sheet is exposed to "soft" radiation, so that a radiation image of a desired part of the object can be obtained in a desirable state and an energy-subtraction image having an excellent graininess can be obtained.

DESCRIPTION OF THE PREFERRED EMBODIMENTS

Figure 1:
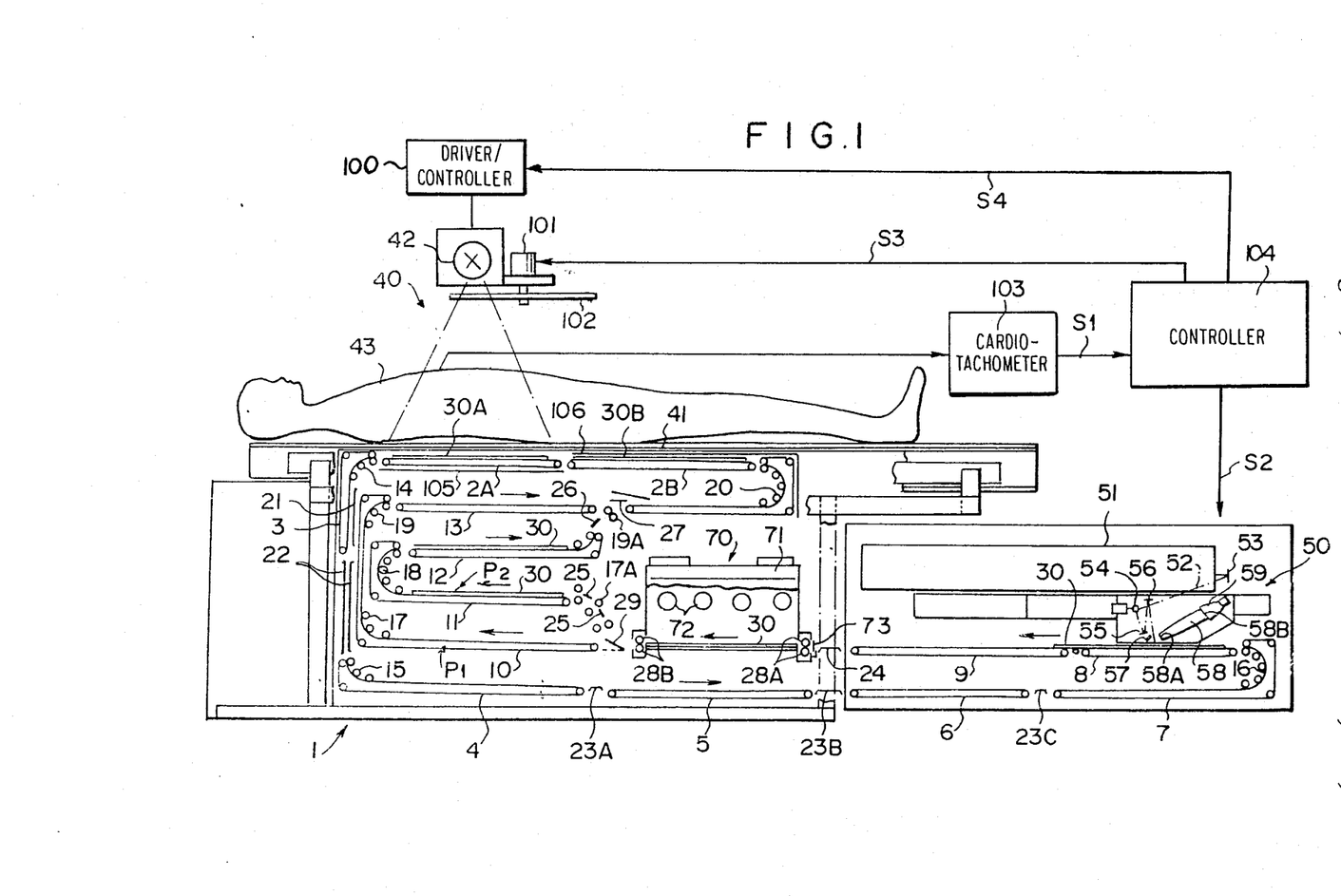
FIG. 1 is a schematic cross-sectional view of a radiation image recording and read-out apparatus in accordance with a first embodiment of the present invention.

FIG. 1 shows a radiation image recording and read-out apparatus 1 in accordance with a first embodiment of the present invention which is for recording a radiation image of the chest abdomen or the like of a patient lying on his back. The radiation image recording and read-out apparatus 1 has a stimulable phosphor sheet recirculating system for transferring six stimulable phosphor sheets 30 at appropriate intervals along a circulation path formed by endless belts 2A, 2B, 3, 4, 5, 6, 7, 8, 9, 10, 11, 12 and 13, guide rollers 14, 15, 16, 17, 17A, 18, 19, 19A and 20 respectively driven by the endless belts 3, 4, 7, 10, 11, 12 and 13, guide plates 21, 22, 23A, 23B, 23C, 24, 25, 26 and 27, nip rollers 28A and 28B, and a path changing plate 29. In the circulation path, the path indicated at P1 formed by the endless belt 10, the guide rollers 17 and 19 and the endless belts 13, and the path indicated at P2 formed by the guide roller 17A, the endless belt 11, the guide roller 18, the endless belt 12 and the guide roller 19A are parallel to each other, and the stimulable phosphor sheets 30 are selectively fed along one of the parallel paths as will become apparent later. The paths P1 and P2 will be referred to as the "first branch path" and the "second branch path", respectively. An image recording table 41 is provided above the uppermost endless belt 2A and a radiation source 42 which may be an X-ray source, for instance, is disposed above the image recording table 41. Thus, an image recording section is formed by the image recording table 41 and the radiation source 42.

A radiation shield plate 105 such as a lead plate is disposed below the endless belt 2A. When the patient 43 is radiographed, one of the stimulable phosphor sheets 30 is positioned on the endless belt 2A and the radiation source 42 is operated with the patient 43 lying on his back on the image recording table 41, whereby a radiation image of the patient 43 is projected on the stimulable phosphor sheet 30 and radiation image information regarding the patient 43 is stored in the stimulable phosphor sheet 30.

An endless belt 2B is disposed upstream (the right side as seen in FIG. 1) of the endless belt 2A and the second stimulable phosphor sheet 30 for energy-subtraction processing waits thereon. In the case of normal recording, the stimulable phosphor sheet 30 is simply passed along the endless belt 2B without waiting. A radiation shield plate 106 is disposed above the endless belt 2B.

The first branch path P1 forms a part of the circulation path along which the stimulable phosphor sheets 30 are transferred in the case of the normal recording. On the other hand, a stimulable phosphor sheet exclusively for energy-subtraction processing, e.g., a stimulable phosphor sheet having different radiation absorption characteristics, is transferred along the second branch path P2. The path changing plate 29 selectively introduces the stimulable phosphor sheet into the first branch path P1 or the second branch path P2 under the control of a controller (not shown).

An image read-out section 50 is provided on the right side end (as seen in FIG. 1) of the radiation image recording and read-out apparatus 1 of this embodiment. In the image read-out section 50, a laser source 51 is provided above the endless belt 8. The image read-out section 50 further comprises a mirror 53, a galvanometer mirror 54 and mirrors 55 and 56 which are disposed to cause a laser beam 52 emitted from the laser source 51 to scan the stimulable phosphor sheet 30 (which is fed to the image read-out section 50 after exposure to the radiation in the image recording section 40) on the endless belt 8 in the direction of width of the stimulable phosphor sheet 30 (the main scanning). Along the main scanning line of the laser beam 52, a reflecting mirror 57 is disposed and light emitted from the stimulable phosphor sheet 30 upon exposure to the laser beam 52 enters a light collecting optical element 58 from light input face 58A thereof directly or after being reflected by the reflecting mirror 57. In the light collecting optical element 58, the light is guided by total internal reflection to a photomultiplier 59 connected to a light output face 58B of the light collecting optical element 58. While the main scanning is effected, the stimulable phosphor sheet 30 is transferred by the endless belt 8 in a direction substantially perpendicular to the main scanning direction (sub-scanning). That is, the stimulable phosphor sheet 30 is two-dimensionally scanned. The image signal obtained by the photomultiplier 59 is fed to an image processing circuit (not shown) and then fed to an image reproducing system such as a CRT or a recording device for reproducing a radiation image on a photosensitive film by scanning the photosensitive film with a light spot. Alternatively, it may be sent to a storage means such as a magnetic recording tape.

Though the time required to read the radiation image information stored in a stimulable phosphor sheet 30 is generally longer than the time required to record the radiation image information on the stimulable phosphor sheet 30, recording on the six stimulable phosphor sheets can be accomplished in a short time and the recorded stimulable phosphor sheets can, for instance, be kept waiting on the endless belts after recording.

In Japanese Unexamined Patent Publication No. 58(1983)-89245, it is proposed to effect "preliminary read-out" in order to ascertain image input information regarding the radiation image information stored in the stimulable phosphor sheet before effecting reading of the radiation image information stored in the stimulable phosphor sheet 30 for the purpose of obtaining the image signal to be actually used for reproducing the image of the object. (This latter reading is generally referred to as "final read-out".) For the preliminary read-out there are used stimulating rays having an energy level lower than that of the stimulating ray to be used in the final reading. On the basis of the image input information obtained by the preliminary read-out the image information signal read in the final read-out can be processed, e.g., can be adjusted in gain, in order to obtain a high quality visible image unaffected by fluctuations in the recording conditions. In the radiation image recording and read-out apparatus of this embodiment, the preliminary read-out and the final read-out can be effected by driving the endless belts 9, 7 and 8 to return the stimulable phosphor sheet 30 to the image reading position after the stimulable phosphor sheet 30 is once transferred to the endless belt 9 upon completion of the preliminary read-out, and by subsequently effecting the final read-out.

From the image information reading section 50, the stimulable phosphor sheet 30 is fed to an erasing section 70 by the endless belt 9. The erasing section 70 includes a housing 71 and a plurality of erasing light sources 72 arranged in the housing 71. After a shutter 73 is opened, the stimulable phosphor sheet 30 is fed by the endless belt 9 until the stimulable phosphor sheet 30 is brought into contact with the nip rollers 28A. Then the stimulable phosphor sheet 30 is introduced into the housing 71 by the nip rollers 28A and the shutter 73 is closed. The erasing light sources 72 emit light in the stimulating wavelength range of the stimulable phosphor on the stimulable phosphor sheet 30, and residual radiation energy in the stimulable phosphor sheet 30 is released therefrom by exposing the stimulable phosphor sheet 30 to the light emitted from the erasing light sources 72. The shutter 73 prevents the erasing light emitted from the erasing light sources 72 from reaching the image information reading section 50, whereby production of noise in the image signal is prevented.

The erased stimulable phosphor sheet 30 is discharged from the erasing section 70 by rotating the nip rollers 28B and then returned to the image recording section 40 by the endless belts 10, 13 and 2B to be delivered to the endless belt 2A in the image recording section 40. When the endless belts 10, 13 and 2B and the image recording section 40 are still occupied by the preceding stimulable phosphor sheet or sheets 30, the following stimulable phosphor sheet 30 is made to wait on one of the endless belts 10, 13 and 2B depending on the number of the preceding stimulable phosphor sheets occupying the endless belts 10, 13 and 2B and the image recording section 40. If the endless belts 10, 13 and 2B and the image recording section 40 are all occupied, the stimulable phosphor sheet 30, i.e., the sixth stimulable phosphor sheet 30, is returned to the endless belt 9 by rotating the nip rollers 28A in the reverse direction after erasure and is made to wait on the endless belt 9.

As described above, the endless belts 2A, 2B, 3 to 13 and the nip rollers 28A and 28B constituting the stimulable phosphor sheet recirculating system are controlled in response to operation of the image recording section 40, the image information reading section 50 and the erasing section 70 to transfer the stimulable phosphor sheet 30 or to support thereon the stimulable phosphor sheet 30.

Now the mechanism for recording for the energy-subtraction processing will be described in detail.

In the radiation image recording and read-out apparatus 1, the circulation transfer system is arranged to discharge the stimulable phosphor sheet 30A on the endless belt 2A after an image has been recorded thereon, and to feed the stimulable phosphor sheet 30B standing by on the endless belt 2B onto the endless belt 2A, whereby the stimulable phosphor sheets 30 are fed to the recording position one by one.

Figure 2:
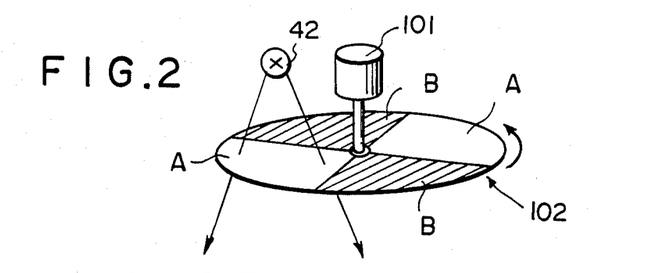
FIG. 2 is a perspective view showing in detail a filter employed in the apparatus of FIG. 1.

The radiation source 42 above the image recording table 41 emits radiation such as X-rays at a desired tube voltage driven by a radiation source driving/controlling device 100. Between the radiation source 42 and the patient 43 is disposed a filter plate 102 for changing the quality of the radiation impinging upon the stimulable phosphor sheet 30A at the recording position after passing through the patient 43. The filter plate 102 is actuated by a filter driving device 101 which may comprise an electric motor, a rotary solenoid or the like. As shown in FIG. 2, the filter plate 102 comprises high-energy region pass filters A formed of copper or the like, and low-energy region pass filters B which may be K-h filters formed of La, Y or the like. The filter driving device 101 rotates the filter plate 102 to selectively position one of the filters A and B in the path of the radiation emitted from the radiation source 42.

Heartbeat of the patient 43 is detected by a cardiotachometer 103, and a heartbeat signal S1 output from the cardiotachometer 103 is fed into a controller 104. The controller 104 delivers a sheet change signal S2 to the endless belts 2A and 2B for changing the stimulable phosphor sheet on the recording position of the endless belt 2A for an unexposed stimulable phosphor sheet, a filter change signal S3 to the filter driving device 101, and a radiation emission signal S4 to the radiation source driving/controlling device 100.

With the patient 43 lying in a predetermined position on the photographing table 41, a image-record start signal is manually input into the controller 104. The controller 104 inputs the sheet change signal S2 and the filter change signal S3 respectively to the endless belts 2A and 2B, and the filter driving device 101 so that one stimulable phosphor sheet 30A is positioned in the recording position on the endless belt 2A and another stimulable phosphor sheet 30B is positioned on the endless belt 2B, and at the same time, the high-energy region pass filter A is positioned in the path of the radiation emitted from the radiation source 42. Alternatively, these operations may be accomplished before the patient 43 lies on the image recording table 41 and may be accomplished manually instead of by the controller 104.

Next, the controller 104 inputs the radiation emission signal S4 into the radiation source driving/controlling device 100 at a predetermined time point in the heartbeat of the patient 43 to drive the radiation source 42 at a relatively high tube voltage (e.g., 120kVp). High-energy radiation thus emitted from the radiation source 42 travels through the high-energy region pass filter A. If low-energy region radiation is contained in the high-energy radiation emitted from the radiation source 42, it is cut by the filter A. A high-energy radiation image of the patient 43 is thus stored in the stimulable phosphor sheet 30A.

Thereafter, the controller 104 delivers the sheet change signal S2 to the endless belts 2A and 2B to discharge the exposed stimulable phosphor sheet 30A from the endless belt 2A and to feed another stimulable phosphor sheet 30B to the endless belt 2A. At the same time, the controller 104 delivers the filter change signal S3 to the filter driving device 101 to bring the low-energy region pass filter B into the path of the radiation emitted from the radiation source 42. Thereafter, the controller 104 inputs the radiation emission signal S4 into the radiation source driving/controlling device 100 at the same predetermined time point in the heartbeat of the patient 43 to drive the radiation source 42 at a relatively low tube voltage (e.g., 60kVp). Low-energy radiation thus emitted from the radiation source 42 travels through the low-energy region pass filter B. A low-energy radiation image of the patient 43 is thus stored in the stimulable phosphor sheet 30B.

The foregoing description presumes that the same kind of stimulable phosphor sheet is used in the both recordings for the energy-subtraction processing. Alternatively, different kinds of stimulable phosphor sheets both exclusively for use in energy-subtraction processing can be used, and in this case the guide rollers 19A are driven under the control of a signal from the controller 104 and the stimulable phosphor sheets on the endless belts 11 and 12 are fed to the endless belts 2A and 2B. Again, an ordinary stimulable phosphor sheet can be used in one recording for the energy-subtraction processing and a stimulable phosphor sheet exclusively for use in the energy-subtraction processing can be used in the other recording. In this case, the former stimulable phosphor sheet is fed to the endless belt 2A by way of the first branch path P1 and the latter stimulable phosphor sheet is fed to the endless belt 2B by way of the second branch path P2.

Owing to the radiation energy absorption characteristics of the particular part whose image is desired to be recorded, the two radiation images stored in the stimulable phosphor sheets 30A and 30B differ from each other in image information regarding the particular part. The energy-subtraction processing for obtaining an image of the particular part from the image information stored in the stimulable phosphor sheets 30A and 30B will be briefly described with reference to FIG. 3, hereinbelow. The stimulable phosphor sheet 30A is scanned with a laser beam 111 which is emitted from a laser source 120 and deflected by a scanning mirror 112 in the direction of arrow X (main scanning) in FIG. 3 with the stimulable phosphor sheet 30A being transferred in the direction of arrow Y (sub-scanning). Light 113 emitted from the stimulable phosphor sheet 30A in the pattern of stored energy upon exposure to the stimulating laser beam 111 enters a light collecting plate 114 from one end face thereof and impinges upon a photomultiplier 115 after traveling the inside of the light collecting plate 114 by total reflection. The light collecting plate 114 may be formed of transparent acrylic resin, for instance. The photomultiplier 115 outputs an image signal S representing the amount of the light 113. The image signal S is converted into a digital image signal $logS_A$ representing the logarithmic value of the image signal S by a logarithmic converter 116 comprising an amplifier and an A/D converter. The digital image signal $logS_A$ is stored in a storage medium 117 such as a magnetic recording disk. In the same manner, the radiation image information stored in the stimulable phosphor sheet 30B is read and a digital image signal $logS_B$ is stored in the storage medium 117.

Figure 3:
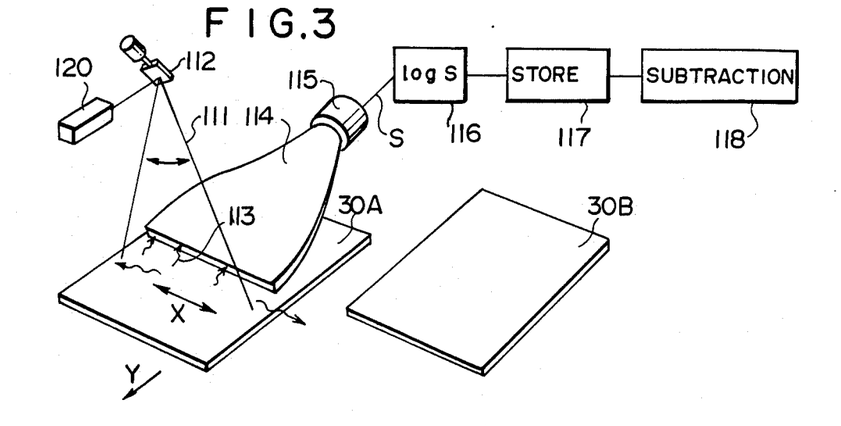
FIG. 3 is a schematic view for illustrating the manner of reading out an image signal from an exposed stimulable phosphor sheet.

The digital image signals $logS_A$ and $logS_B$ respectively obtained from the stimulable phosphor sheets 30A and 30B are then read out from the storage medium 117 and are input into a subtraction operation circuit 118. The subtraction operation circuit 118 weights the digital image signals $logS_A$ and $logS_B$ with appropriate values (constants a and b in the following formula) and calculates the difference therebetween for each pair of corresponding picture elements, thereby obtaining a digital difference signal Ssub. That is, $$Ssub = a \cdot logS_A - b \cdot logS_B + c \text{ (} a, b \text{ and } c \text{ being constants)}$$

In the above formula, the constant c is a bias component for substantially uniformizing the difference signals Ssub in density. The digital difference signals Ssub are subjected to signal processings such as gradation processing and then sent to a display device such as a CRT or a reproducing system to reproduce an energy subtraction image on the basis of the digital difference signals Ssub.

Figure 4:
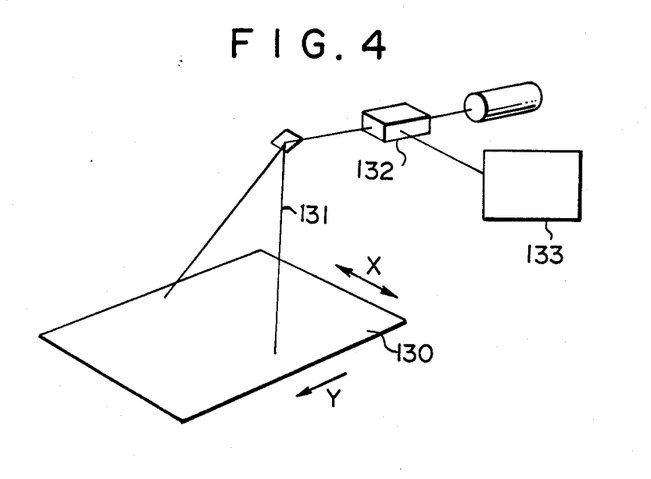
FIG. 4 is a schematic view for illustrating an example of a system for reproducing an image obtained by the energy-subtraction method.

FIG. 4 shows an example of the energy-subtraction image reproducing system. In FIG. 4, a photosensitive film 130 is transferred in the direction of arrow Y (sub-scanning) and at the same time the photosensitive film 130 is scanned with a laser beam 131 in the direction of arrow X (main scanning). The laser beam 131 is modulated by an A/0 modulator according to an image signal fed from an image signal feeder 133, thereby forming a visible image on the photosensitive film 130. By inputting said difference signal Ssub as the image signal, an energy subtraction image of a desired part extracted from an image of the overall object can be recorded on the photosensitive film 130.

Since the high-energy radiation image stored in the stimulable phosphor sheet 30A and the low-energy radiation image stored in the stimulable phosphor sheet 30B are respectively recorded by radiations the energy regions of which are positively separated from each other by the high-energy region pass filter A and the low-energy region pass filter B, none of the desired part is lost during energy-subtraction processing and noise can be reduced.

Change of the stimulable phosphor sheets, change of the filters and driving of the radiation source can be accomplished within about 0.3 seconds in the embodiment described above, and accordingly both the high-energy recording and the low-energy recording can be accomplished within two consecutive heartbeats, whereby the recording of a motion artifact can be avoided.

When the high-energy region pass filter A and the low-energy region pass filter B have a sufficient energy separation ability, the tube voltage of the radiation source 42 need not be changed between recording of the high-energy radiation image and the low-energy radiation image. It is also possible to use only one or the other of the high-energy region pass filter and the low-energy region pass filter. In this case, it is preferred that the high-energy region pass filter be used since the removal of low energy radiation components from radiation emitted at a high tube voltage can be realized more efficiently by the high-energy region pass filter, e.g. one formed of copper, than can the removal of high energy radiation components from radiation emitted at a low tube voltage by the K-h filter formed of La, Y or the like.

Figure 5A:
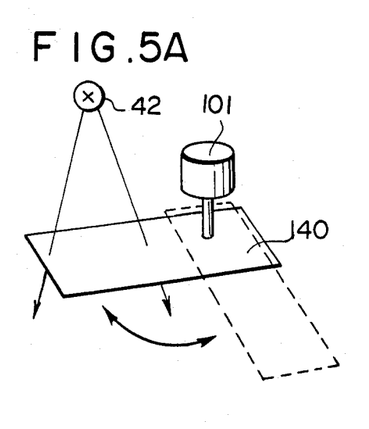
FIGS. 5A and 5B are perspective views of other examples of the filter which can be employed in the apparatus of FIG. 1.
Figure 5B:
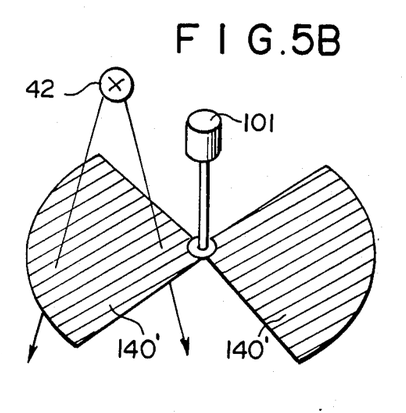
Figure 6:
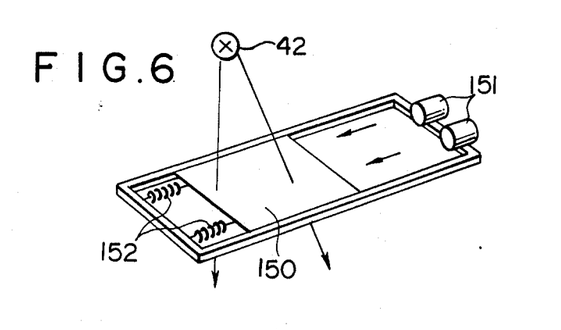
FIG. 6 is a perspective view of still another example of the filter.

When only one filter is used, there can be used a filter 140 which can be swung by 90° between an operative position in which it is inserted into the path of radiation emitted from the radiation source 42 and a retracted position away from the path as shown in FIG. 5A. Otherwise, a filter having a pair of diametrically opposed filter portions 140' as shown in FIG. 5B can be used. The filter shown in FIG. 5B is rotated to selectively bring one of the filter portions 140' into the path of the radiation emitted from the radiation source 42. In another example of the filter shown in FIG. 6, a filter portion 150 is slidable between an operative position in which it is inserted into the path of radiation emitted from the radiation source 42 and a retracted position away from the path. The filter portion 150 is urged toward the retracted position by a spring 152 and is moved to the operative position under the force of an electromagnet 151 overcoming the force of the spring 152. When the electromagnet 151 is de-energized, the filter portion 150 is moved to the retracted position under the force of the spring 152.

Though not essential, it is advantageous to accomplish recording in synchronization with the heartbeat of the patient as described in the above embodiment since this prevent recording of a motion artifact.

While in the embodiment described above the filter is disposed between the patient 43 and the radiation source 42, the filter can also be disposed in other various positions. For example, the filter may be disposed between the patient and the stimulable phosphor sheet. However, in order to reduce the irradiation dose to the patient and to reduce the size of the filter, the filter is preferably disposed between the patient and the radiation source and more preferably the filter is disposed near the radiation source.

Figure 7:
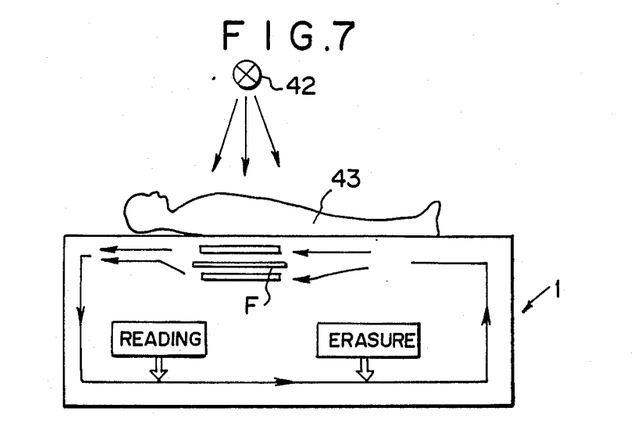
FIG. 7 is a schematic view for illustrating the principle of another embodiment of the present invention.
Figure 8:
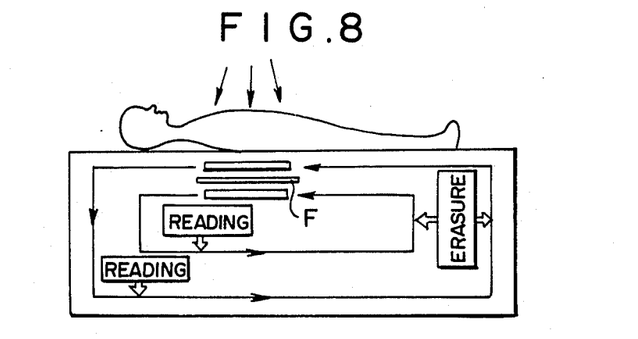
FIG. 8 is a schematic view for illustrating the principle of still another embodiment of the present invention.

In accordance with one aspect of the present invention, radiation images for energy-subtraction processing are successively recorded on a pair of stimulable phosphor sheets using different quality radiations. In this case, as described above in conjunction with the embodiment shown in FIGS. 1 to 6, the stimulable phosphor sheets are separately fed to the image recording position and the quality of the radiation used for image recording is changed between the first sheet and the second. In accordance with another aspect of the present invention, a pair of stimulable phosphor sheets are simultaneously positioned in the image recording position superposed one on the other with a filter intervening therebetween, and are simultaneously exposed to radiation emitted from the radiation source. In one embodiment, as shown in FIG. 7, two stimulable phosphor sheets are normally circulated along a single circulation path and when the energy-subtraction process is to be accomplished, they are superposed one on the other with a filter F intervening therebetween in the image recording position, or two of a plurality of stimulable phosphor sheets normally circulated along a single circulation path are superposed one on the other when the energy-subtraction process is to be accomplished. In another embodiment, as shown in FIG. 8, two stimulable phosphor sheets are normally circulated along separate parallel circulation paths and when the energy-subtraction process is to be accomplished, they are positioned in the image recording position vertically aligned with each other with a filter F intervening therebetween, or two of a plurality of stimulable phosphor sheets normally circulated along separate parallel circulation paths are vertically aligned with each other in the image recording position.

Figure 9:
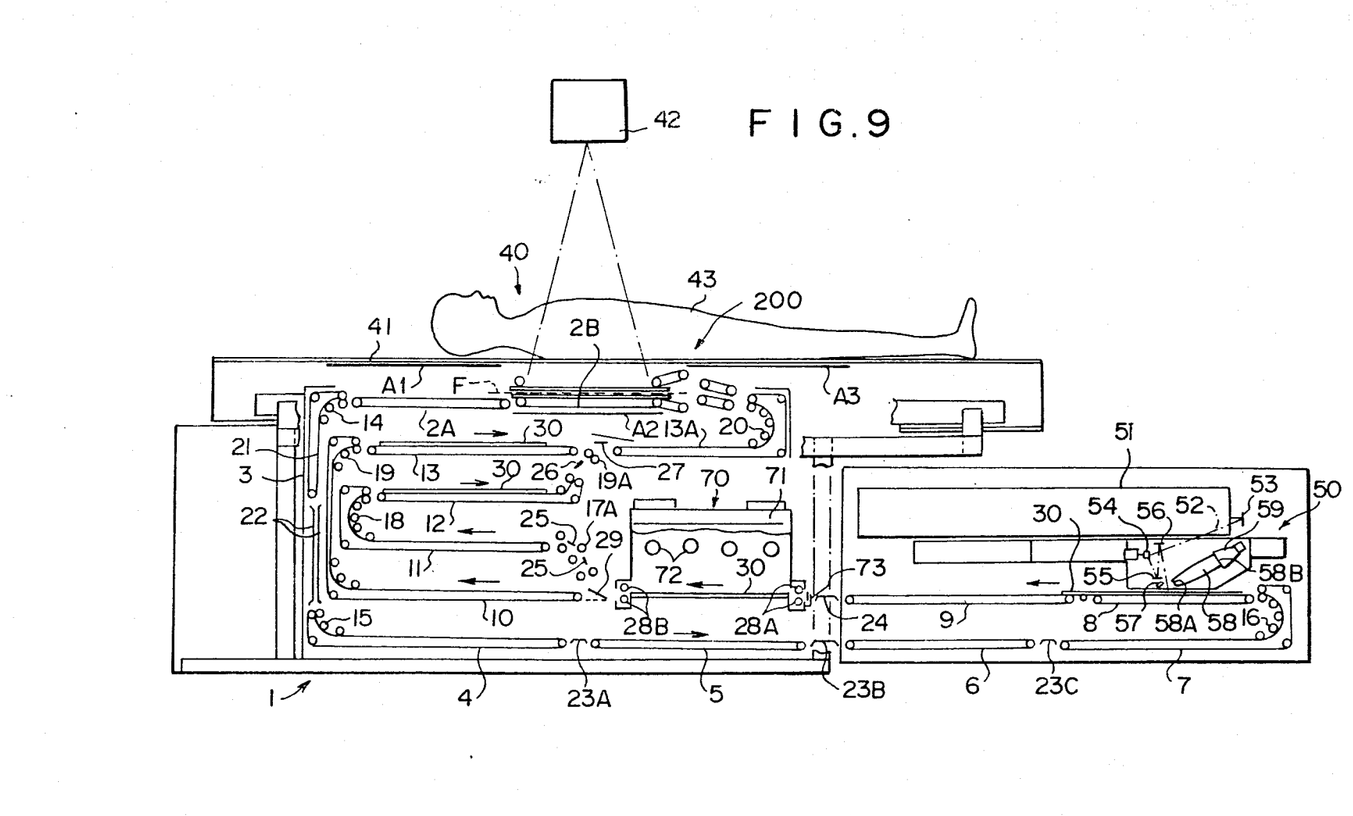
FIG. 9 is a view similar to FIG. 1 but showing a radiation image recording and read-out apparatus in accordance with another embodiment of the present invention.

Now a concrete embodiment of the present invention corresponding to the embodiment shown in FIG. 7 will be described in detail with reference to FIG. 9. The embodiment shown in FIG. 9 is very similar to that shown in FIG. 1, and accordingly, the parts analogous to the parts shown in FIG. 1 are given the same reference numerals and will not be described in detail here.

The radiation image recording and read-out apparatus 1' of this embodiment has a stimulable phosphor sheet recirculating system for transferring six stimulable phosphor sheets 30 spaced at appropriate intervals along a circulation path formed by endless belts 2A, 2B, 3, 4, 5, 6, 7, 8, 9, 10, 11, 12, 13 and 13A, guide rollers 14, 15, 16, 17, 18, 19 and 20 respectively driven by the endless belts 3, 4, 7, 10, 11, 12 and 13, rollers 17A and 19A, guide plates 21, 22, 23A, 23B, 23C, 24, 25, 26 and 27, nip rollers 28A and 28B, a path changing plate 29 and a stimulable phosphor sheet positioning mechanism 200. An image recording table 41 is provided above the uppermost endless belt 2B and a radiation source 42 which may be an X-ray source, for instance, is disposed above the image recording table 41. Thus, an image recording section 40 is formed by the photographing table 41 and the radiation source 42. Radiation shield plates A1, A2 and A3 are provided in the image recording section 40 to prevent radiation emitted from the radiation source 42 from going outside the image recording section 40.

When a pair of stimulable phosphor sheets are to be simultaneously exposed to radiation for the purpose of the energy-subtraction processing, a pair of stimulable phosphor sheets are positioned on the endless belt 2B superposed one on the other with a filter F intervening therebetween by the stimulable phosphor sheet positioning mechanism 200. Then the radiation source 42 is energized and radiation images are recorded on the stimulable phosphor sheets. By virtue of the filter F intervening therebetween, the two stimulable phosphor sheets are exposed to radiations of different qualities, whereby two radiation images usable for the energy-subtraction processing can be obtained by one operation of the radiation source 42.

Now an example of the stimulable phosphor sheet positioning mechanism 200 will be described with reference to FIGS. 10A to 10G.

Figure 10A:
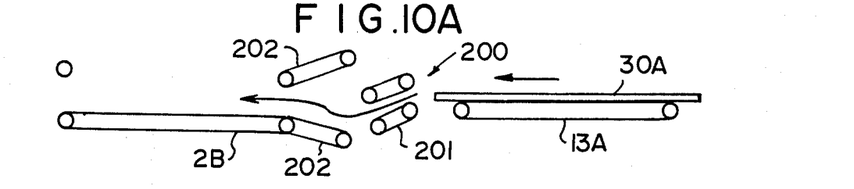
FIGS. 10A to 10G are views for illustrating the operation of the stimulable phosphor sheet positioning means employed in the embodiment of FIG. 9, FIGS. 11A to 11F are views for illustrating the operation of another example of the stimulable phosphor sheet positioning means.
Figure 10B:
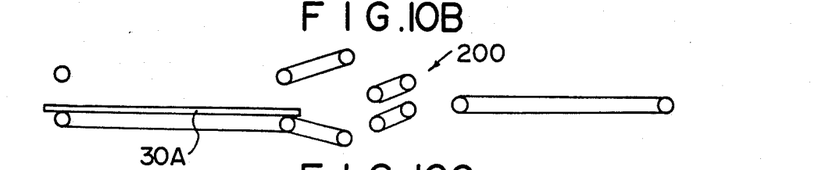
Figure 10C:
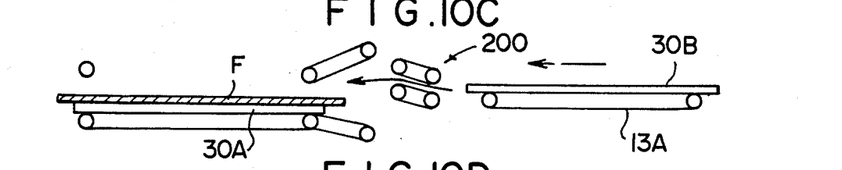
Figure 10D:
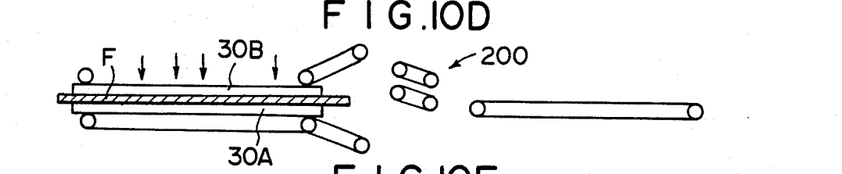
Figure 10E:
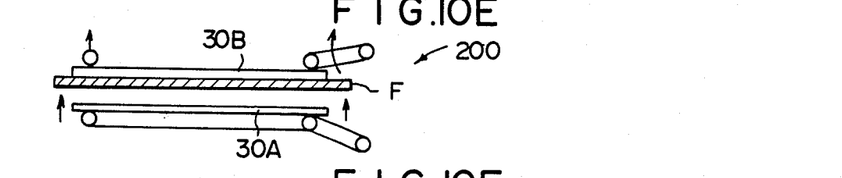

In FIGS. 10A to 10G, a first stimulable phosphor sheet 30A is transferred by the endless belt 13A to between a pair of deflector belts 201 and then transferred to the endless belt 2B in the image recording section 40 under the guidance of the deflector belts 201 and guide belts 202. At this time the deflector belts 201 are inclined downward toward the endless belt 2B (FIGS. 10A and 10B). Thereafter, the filter F is moved over the first stimulable phosphor sheet 30A (FIG. 10C). The mechanism for moving the filter F over the stimulable phosphor sheet 30A will be described later. Then the deflector belts 201 are inclined upward toward the endless belt 2b and a second stimulable phosphor sheet 30B is positioned on the filter F to be vertically aligned with the first stimulable phosphor sheet 30A (FIG. 10D).

Figure 10F:
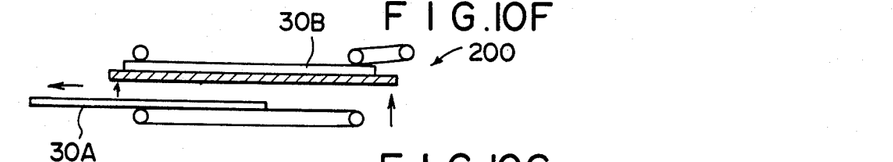
Figure 10G:
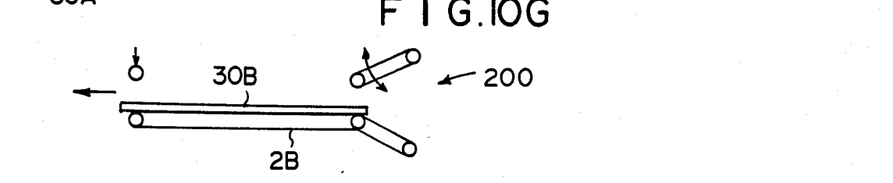

After exposure to radiation, the filter F is slightly lifted away from the first stimulable phosphor sheet 30A together with the second stimulable phosphor sheet 30B (FIG. 10E), and then the first stimulable phosphor sheet 30A is transferred from the endless belt 2B toward the endless belt 2A (FIG. 10F). By lifting the filter F before the first stimulable phosphor sheet 30A is moved, the first stimulable phosphor sheet 30A is prevented from being scratched. Thereafter, the filter F is retracted and the second stimulable phosphor sheet 30B is transferred from the endless belt 2B toward the endless belt 2A (FIG. 10G).

Though not shown, the filter F may be lifted by any suitable means. Instead of deflector belts 201, guide rollers can be used. Further, the filter F may be first positioned above the endless belt 2B spaced therefrom and then the first stimulable phosphor sheet 30A may be inserted therebetween. In this case, the inclination of the deflector belts 201 must be carefully controlled.

FIGS. 11A to 11F show another example of the stimulable phosphor sheet positioning mechanism in which a magazine is employed.

Figures 11A, 11B:
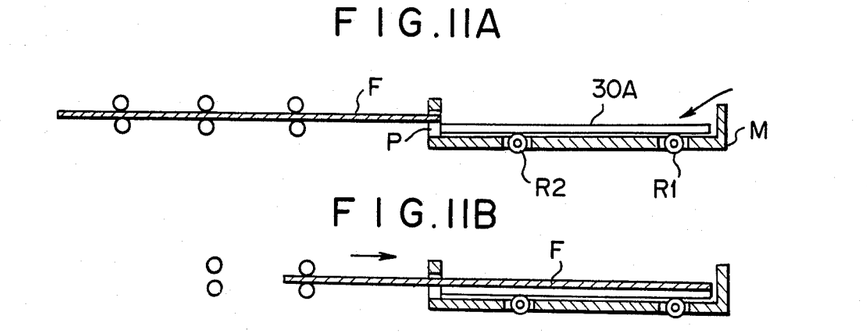
Figure 11C:
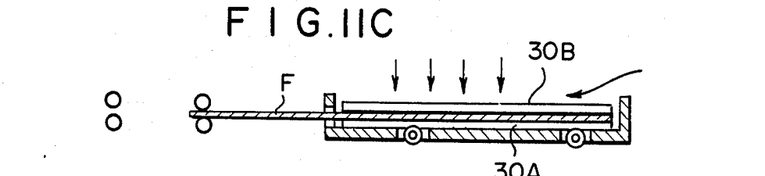
Figure 11D:
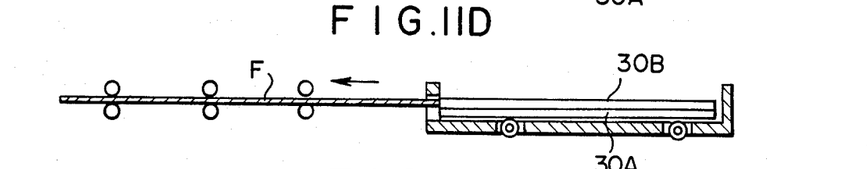
Figure 11E:
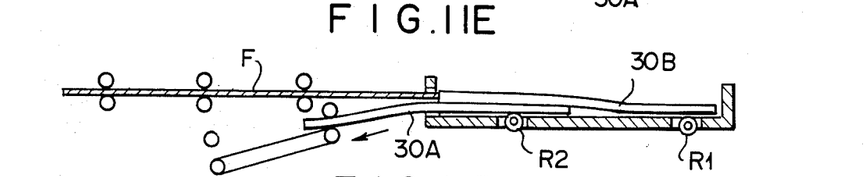
Figure 11F:
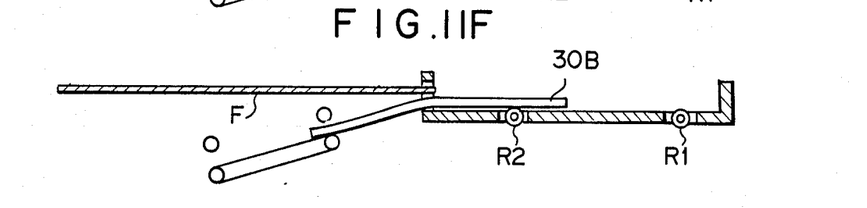

A magazine M is provided with rollers R1 and R2 in the base wall thereof. An outlet opening P is formed on the discharge side end wall of the magazine M and an opening through which the filter F is inserted into the magazine M is formed above the outlet opening P.

A first stimulable phosphor sheet 30A is first transferred into the magazine M from the right side as shown by the arrow (FIG. 11A). Then the filter F is inserted into the magazine M over the first stimulable phosphor sheet 30A (FIG. 11B). Then a first stimulable phosphor sheet 30B is transferred into the magazine M over the filter F (FIG. 5C). In this state, the stimulable phosphor sheets are exposed to radiation. After exposure, the filter F is retracted away from the magazine M, whereby the second stimulable phosphor sheet 30B falls on the first stimulable phosphor sheet 30A. (FIG. 11D) Thereafter, the first stimulable phosphor sheet 30A is discharged by driving the rollers R1 and R2. At this time, the second stimulable phosphor sheet 30B on the first stimulable phosphor sheet 30A is prevented from being discharged together with the first stimulable phosphor sheet 30A by abutment between the right side end of the filter F and the left side end of the second stimulable phosphor sheet 30B. (FIG. 11E) Finally the second stimulable phosphor sheet 30B is discharged by driving the rollers R1 and R2. (FIG. 11F The first stimulable phosphor sheet 30A may be discharged before the filter F is retracted.

The first and second stimulable phosphor sheets 30A and 30B may be discharged from the image recording section 40 as superposed, and then may be separated from each other downstream of the image recording section 40.

Figures 12A, 12B:
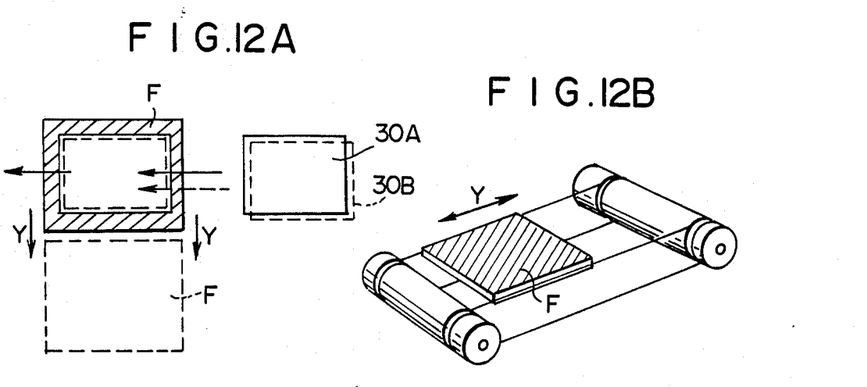
FIGS. 12A and 12B are views for illustrating the mechanism for moving the filter employed in the embodiment of FIG. 9.

The filter F can be inserted into and retracted from the image recording section 40 by moving it in a direction perpendicular (as shown by arrow Y) to the transfer direction of the stimulable phosphor sheets as shown in FIG. 12A. The filter F can be moved by various known mechanisms such as one comprising a wire driving system as shown in FIG. 12B.

As disclosed in Japanese Unexamined Patent Publication No. 56(1981)-11400, by recording radiation images of an object on a plurality of stimulable phosphor sheets with radiation of the same quality and summing the image signals obtained from the stimulable phosphor sheets, noise can be reduced. The embodiment shown in FIG. 9 can be also used for this purpose. In this case, two or more stimulable phosphor sheets are superposed without a filter intervening therebetween.

We claim:

1. A radiation image recording and read-out apparatus comprising:
  (i) a circulating and conveying means for conveying a plurality of stimulable phosphor sheets for recording radiation images thereof along a predetermined circulation path,
  (ii) an image recording section positioned on said circulation path for recording the radiation image of an object on each of said stimulable phosphor sheets by exposing each stimulable phosphor sheet to a radiation passing through said object,
  (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal,
  (iv) an erasing section positioned on said circulation path for, prior to the next image recording on said stimulable phosphor sheet for which the image read-out has been conducted at said image read-out section, having said stimulable phosphor sheet release the radiation energy remaining in said stimulable phosphor sheet, and
  (v) a radiation quality changing means for changing the quality of the radiation to be irradiated to the stimulable phosphor sheet to record radiation images of the object in the image recording section using different radiation qualities, a stimulable phosphor sheet changing means for discharging one stimulable phosphor sheet, which has been recorded with a first radiation quality, from the recording position in the image recording section and positioning another stimulable phosphor sheet in the recording position of the image recording section for recording with a second, different radiation quality, and a synchronizing means which actuates the stimulable phosphor sheet changing means is synchronization with the radiation quality changing means, wherein said circulating and conveying means comprises means for positioning said one stimulable phosphor sheet for recording, and means for holding said another stimulable phosphor sheet during said recording, wherein said stimulable phosphor sheet changing means cooperates with said circulating and conveying means and said synchronizing means to discharge said one stimulable phosphor sheet after recording said radiation image at said first radiation quality and to insert said another stimulable phosphor sheet into said recording position to record said radiation image at said second radiation quality.

2. A radiation image recording and read-out apparatus as defined in claim 1 in which said radiation quality changing means comprises means for changing the tube voltage of the radiation source.

3. A radiation image recording and read-out apparatus as defined in claim 1 in which said radiation quality changing means comprises a filter which is inserted into or retracted away from the path of the radiation between said radiation source and the stimulable phosphor sheet in the recording position of the image recording section.

4. A radiation image recording and read-out apparatus as defined in claim 1 in which said radiation quality changing means comprises a plurality of filters which have different radiation transmission characteristics and are selectively inserted into the path of the radiation.

5. A radiation image recording and read-out apparatus as defined in claim 1 in which said radiation quality changing means comprises means for changing the tube voltage of the radiation source and a filter which is inserted into or retracted away from the path of the radiation between said radiation source and the stimulable phosphor sheet in the recording position of the image recording section.

6. A radiation image recording and read-out apparatus as defined in claim 1 in which said object is a human body and said radiation quality changing includes means for operating in synchronization with heartbeat of the human body.

7. A radiation image recording and read-out apparatus as defined in claim 1, 2, 3, 4, 5 or 6 in which at least two different kinds of stimulable phosphor sheet having different radiation absorption characteristics are included among said stimulable phosphor sheets.

8. A radiation image recording and read-out apparatus comprising:
  (i) a circulating and conveying means for conveying a plurality of stimulable phosphor sheets for recording radiation images thereon along a predetermined circulation path,
  (ii) an image recording section positioned on said circulation path for recording the radiation image of an object on each of said stimulable phosphor sheets by exposing each stimulable phosphor sheet to a radiation passing through said object,
  (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal,
  (iv) an erasing section positioned on said circulation path for, prior to the next image recording on said stimulable phosphor sheet for which the image read-out has been conducted at said image read-out section, having said stimulable phosphor sheet release the radiation energy remaining in said stimulable phosphor sheet, and (v) a stimulable phosphor sheet feeding/discharging means which feeds at least two stimulable phosphor sheets to the image recording section in a superposed state with a filter intervening therebetween and discharges the stimulable phosphor sheets after exposure to radiation from the image recording section to the circulation path, wherein said circulating and conveying means comprises means for providing first and second branch paths, ones of said stimulable phosphor sheets passing through said first branch path for recording said radiation image at a first radiation quality, others of said stimulable phosphor sheets passing along said second branch path for recording the same radiation image at a second, different quality, said stimulable phosphor sheet feeding/discharging means cooperating with said means for providing said first and second branch paths to position one of said stimulable phosphor sheets first, moving said filter over said stimulable phosphor sheet, and then placing a second stimulable phosphor sheet over said filter, so that said filter is sandwiched between said stimulable phosphor sheets, said stimulable phosphor sheets being removed in reverse order to their placement, and said filter being removed after an image is recorded.

9. A radiation image recording and read-out apparatus as defined in claim 8 in which said stimulable phosphor sheet feeding/discharging means feeds said at least two stimulable phosphor sheets to the image recording section one by one.

10. A radiation image recording and read-out apparatus as defined in claim 8 or 9 in which at least two different kinds of stimulable phosphor sheet having different radiation absorption characteristics are included among said stimulable phosphor sheets.

* * * * *